United States Patent
Ogata et al.

[11] Patent Number: 6,038,109
[45] Date of Patent: Mar. 14, 2000

[54] MAGNETIC HEAD AND METHOD OF MANUFACTURING THE SAME

[75] Inventors: Seiichi Ogata; Tadashi Saito; Shinji Takahashi; Teruo Inaguma, all of Miyagi, Japan

[73] Assignee: Sony Corporation, Tokyo, Japan

[21] Appl. No.: 08/811,639

[22] Filed: Mar. 5, 1997

[30] Foreign Application Priority Data

Mar. 7, 1996 [JP] Japan ............................... P08-050571

[51] Int. Cl.$^7$ ...................................................... G11B 5/17
[52] U.S. Cl. ............................................................ 360/123
[58] Field of Search ................................. 360/122, 123, 360/125, 126, 127

[56] References Cited

U.S. PATENT DOCUMENTS

| | | | |
|---|---|---|---|
| 4,860,140 | 8/1989 | Momata et al. | 360/127 |
| 4,901,178 | 2/1990 | Kobayashi et al. | 360/126 |
| 5,666,249 | 9/1997 | Ohmori et al. | 360/123 |

FOREIGN PATENT DOCUMENTS

| | | |
|---|---|---|
| 63-231713 | 9/1988 | Japan . |
| 4-137207 | 5/1992 | Japan . |
| 6-259717 | 9/1994 | Japan . |

*Primary Examiner*—David L. Ometz
*Attorney, Agent, or Firm*—Hill & Simpson

[57] ABSTRACT

According to a magnetic head and a method of manufacturing the same, a connecting process required when a magnetic head is attached to a head base can be implemented with ease. A pair of magnetic core half blocks (3, 4) are joined to form a magnetic core for forming a closed magnetic circuit. A thin film coil (6) is formed on the joint surface in which the magnetic core half blocks (3, 4) are joined. Terminals (7) of the thin film coil (6) are formed on the same plane of a head side surface (10*a*) intersecting the above-mentioned joint surface, resulting in a magnetic head (10) being constructed.

3 Claims, 18 Drawing Sheets

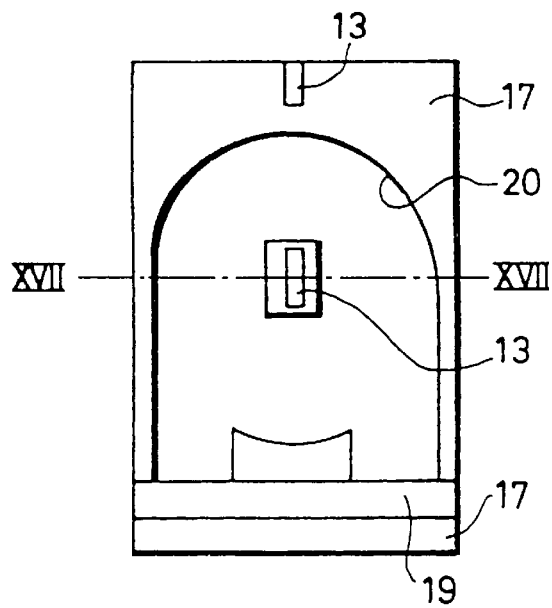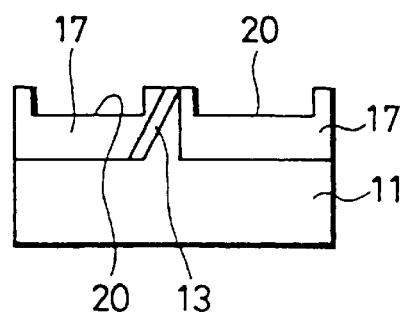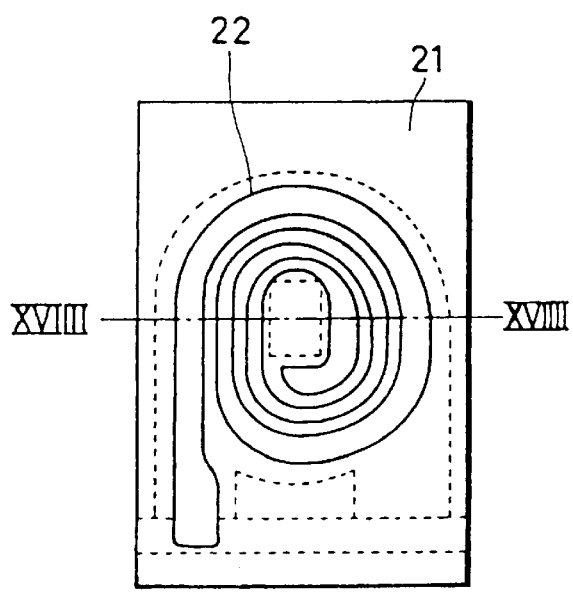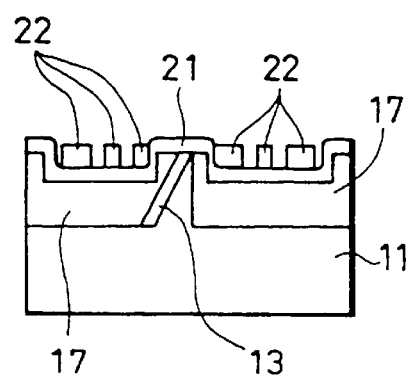

MAGNETIC HEAD AND METHOD OF MANUFACTURING THE SAME

BACKGROUND OF THE INVENTION

1. Field of the Invention

The present invention relates to a magnetic head for use with a magnetic recording apparatus such as a video cassette recorder (VCR) and a method of manufacturing such magnetic head.

2. Description of the Related Art

As a magnetic head for use with a VCR, there is now commercially available a magnetic head, generally referred to as a "metal-in-gap (MIG) type magnetic head", having a metal magnetic layer formed on a ferrite magnetic core on its surface with a magnetic gap formed thereon and a magnetic head, generally referred to as a "laminated-type magnetic head", having a metal magnetic layer held between non-magnetic ceramic bases. In order to cope with a future demand of improving a quality of picture and of promoting the development of a digital VCR, magnetic heads have to demonstrate satisfactory electromagnetic transducing properties in higher frequency bands, and a plurality of magnetic heads have to be mounted on a small head drum.

However, the metal-in-gap (MIG) type magnetic head is large in impedance, and is therefore not suitable for use in the high frequency bands.

In the case of the laminated-type magnetic head, a thickness of a metal magnetic layer forming a magnetic path has to be reduced as a track width is reduced in order to effect a high-density recording. As a consequence, the laminated-type magnetic head is lowered in playback efficiency, and there is a limit in increasing the number of magnetic heads on the head drum.

Japanese laid-open patent publication No. 63-231713, for example, describes a magnetic head which can demonstrate satisfactory electromagnetic transducing properties in the high frequency band. This type of magnetic head will hereinafter be referred to as a "bulk thin film magnetic head" whose magnetic path formed of a metal magnetic layer is smaller than that of an ordinary VCR magnetic head and in which a thin film coil is formed on a magnetic gap forming surface by thin film process.

A structures of a bulk thin film magnetic head will be described with reference to FIGS. 1 through 4.

FIGS. 1 and 3 are perspective views of bulk thin film magnetic heads. FIG. 2 is a schematic diagram showing the bulk thin film head shown in FIG. 1 at its portion near a magnetic gap, and FIG. 4 is a schematic diagram showing the bulk thin film head shown in FIG. 3 at its portion near a magnetic gap. In FIGS. 2 and 4, the surface of the bulk thin film magnetic head is partly removed in order to facilitate the understanding of the inside of the bulk thin film magnetic head.

A bulk thin film magnetic head, generally depicted at reference numeral 50 in FIGS. 1 and 2, comprises a non-magnetic base 53 and a pair of magnetic core half blocks 51, 52 composed of metal magnetic layers 54 and glasses 55. The pair of magnetic core half blocks 51, 52 are joined to the non-magnetic base 53 at their metal magnetic layers 54. In this example, the metal magnetic layer 54 is a laminated layer of three magnetic layers laminated through non-magnetic layers 54'.

The two magnetic core half blocks 51, 52 have a winding groove 56 defined therein for winding wires around the magnetic head. The winding grooves 56 has a winding of thin film coil 57 provided therein in order to effect electromagnetic transduction.

The metal magnetic layers 54 have on their joined surfaces a front gap $g_F$ formed on a sliding surface 58 along which a magnetic recording medium (not shown) slides and a back gap $g_B$ formed on the opposite side of the sliding surface 58 across the winding groove 56.

One magnetic core half block 52 is extended on the side opposite to the sliding surface 58 of the magnetic recording medium, and the extended magnetic core half block 52 has a thin film coil terminal (connection terminal) 59 formed on the extended surface of the joined surface of the magnetic core half blocks 51, 52 at its surface facing the outside. of the extended surface of the confronting surface of the magnetic core half blocks 51, 52. The thin film coil 57 is electrically connected to the outside through the connection made by a suitable means, such as wires, of the connection terminal 59.

A bulk thin film magnetic head, generally depicted at reference numeral 60 in FIGS. 3 and 4 has substantially the same configuration as the bulk thin film magnetic head 50 shown in FIGS. 1 and 2 at its portion near a sliding surface 68. The bulk thin film magnetic head 60 comprises a non-magnetic base 63 and a pair of magnetic core half blocks 61, 62 and has an inclined surface 70 formed on the opposite side of the sliding surface 68 with a predetermined inclination angle with respect to the joined surface of the magnetic core half blocks 61, and 62, and have substantially the same configuration. A thin film coil terminal (connection terminal) 69 is formed on the inclined surface 70.

According to these bulk thin film magnetic heads 50, 60, winding grooves 56, 66 can be miniaturized and therefore the magnetic heads 50, 60 can be reduced in size.

In these bulk thin film magnetic heads 50, 60, the connection terminals 59, 69 for connecting the thin film coils 57, 67 to the outside are disposed on the same planes of the thin film coils 57, 67, i.e. on the planes parallel to the planes opposing magnetic gaps g.

Therefore, in the process of connecting the thin film coils 57, 67 to the outside, head bases 71 are connected to the connection terminals 59, 60 disposed on the surfaces inclined with an inclination angle corresponding to an azimuth angle in the direction perpendicular to attaching surfaces 50a, 60a, i.e. head side surfaces in which head chips (magnetic heads 50, 60) are attached to the head bases 71 or the like as shown in FIGS. 5 and 6. Thus, it is necessary to provide a special wiring machine having a complex mechanism for connecting the connection terminals 59, 60 to the outside while the head bases 71 are being rotated. Otherwise, a cumbersome work for connecting the connection terminals 59, 60 is required.

SUMMARY OF THE INVENTION

In view of the aforesaid aspect, it is an object of the present invention to provide a magnetic head which can be manufactured with ease by simplifying a connection process and a method of manufacturing such magnetic head.

In a magnetic head according to the present invention, a thin film coil is formed on the joint surface in which a pair of magnetic core half blocks are joined and a connection terminal of the thin film coil is formed within the same plane of a head side surface intersecting the above joint surface.

In a method of manufacturing a magnetic head according to the present invention, a magnetic head is manufactured such that a terminal groove is formed at the position outside a portion which serves as a back gap in parallel to a winding groove, a conductor is filled into the terminal groove, a thin film coil is formed, and the conductor is faced to the cutting surface of head chips as a terminal.

According to the arrangement of the present invention, the thin film coil terminal is formed within the same plane of the head side surface intersecting the joint surface so that, when connection for electrically connecting a head base to which a magnetic head is attached and the magnetic head is formed, the connection can be easily formed without cumbersome process.

According to the manufacturing method of the present invention, a terminal groove is formed at the position outside the portion which serves as the back gap in parallel to the winding groove, the conductor is filled into the terminal groove and the thin film coil is formed. Thereafter, the whole is cut into head chips and the conductor is faced to the cutting surface as the terminal, whereby the terminal can be formed on the head side surface crossing the joint surface.

According to the present invention, there is provided a magnetic head which is comprised of a base made of a non-magnetic material, a pair of magnetic core half blocks bonded to the non-magnetic base, a magnetic core composed of a pair of magnetic core half blocks for forming a closed magnetic circuit when a pair of magnetic core half blocks are joined, and a thin film coil formed on a joint surface in which a pair of magnetic core half blocks are joined, wherein a terminal of the thin film coil is formed on the same plane of a head side surface intersecting the joint surface.

According to the present invention, the thin film coil has two terminals formed at different positions in the gap depth direction of a magnetic gap.

According to the present invention, there is provided a method of manufacturing a magnetic head which is comprised of the steps of forming a metal magnetic layer on one surface of a base, forming winding grooves, planing the surface of the base by filling the winding grooves with glass, forming terminal grooves at the position outside a portion serving as a back gap in parallel to the winding grooves, filling a conductor into the terminal grooves, forming a thin film coil, and cutting the base into head chips and opposing the conductor to a cutting surface as a terminal.

BRIEF DESCRIPTION OF THE DRAWINGS

FIG. 16 is a plan view illustrative of a manufacturing process of a magnetic head according to the present invention;

FIG. 17 is a cross-sectional view taken along the line XVII—XVII in FIG. 16;

FIG. 18 is a plan view illustrative of a manufacturing process of a magnetic head according to the present invention;

FIG. 19 is a cross-sectional view taken along the line IXX—IXX in FIG. 18;

DETAILED DESCRIPTION OF THE PREFERRED EMBODIMENTS

The present invention will hereinafter be described with reference to the drawings. A magnetic head according to the present invention is applied to a bulk thin film magnetic head for use with a VCR.

Figure 7:
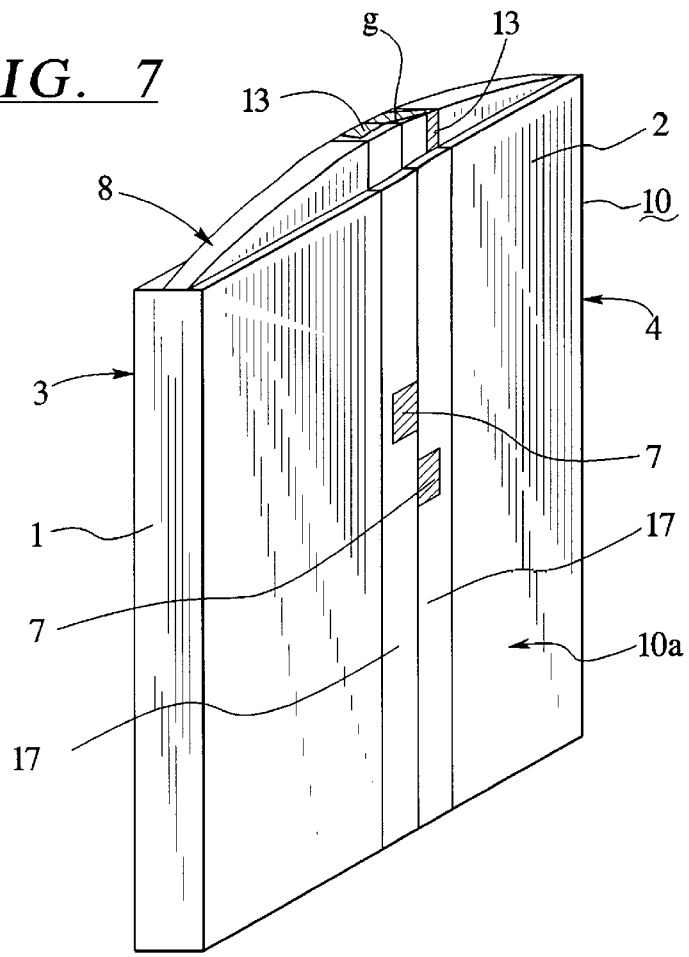
FIG. 7 is a perspective view illustrating a magnetic head according to an embodiment of the present invention.
Figure 8:
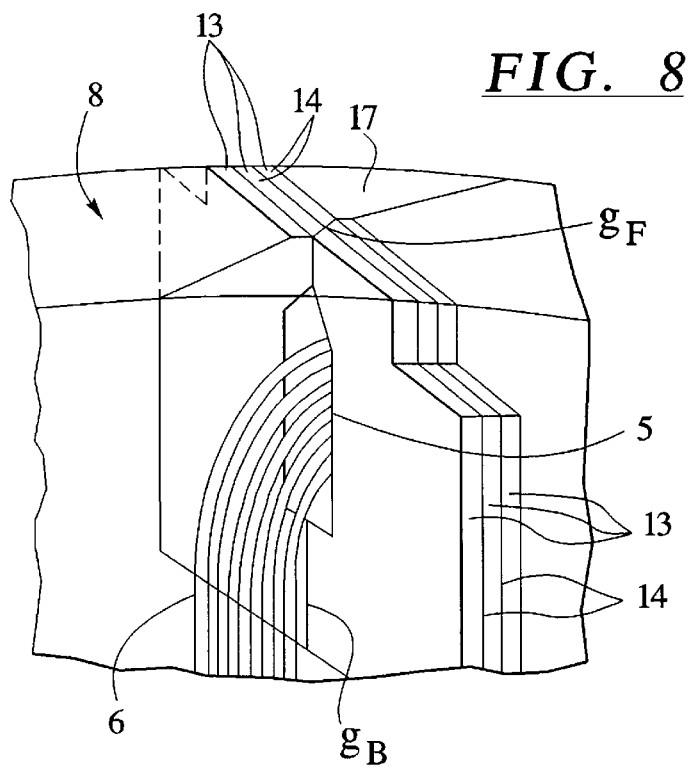
FIG. 8 is a schematic diagram illustrating a part of the magnetic head shown in FIG. 7 in an enlarged scale.

FIG. 7 is a perspective view of a magnetic head 10 according to the present invention, and FIG. 8 is a schematic diagram showing a part of the magnetic head 10 shown in FIG. 7 in an enlarged scale. As illustrated, the magnetic head 10 comprises a pair of non-magnetic bases 1, 2 and a pair of magnetic core half blocks 3, 4 each having a metal magnetic layer 13 forming a magnetic path on one side thereof. The end faces of the magnetic core half blocks 3, 4 are joined at their joint surfaces on which the metal magnetic layers 13 are formed. In FIG. 7, reference letter g designates a magnetic gap, and reference numeral 17 designates a glass embedded in a track width restricting groove. FIG. 8 shows the inside structure of the magnetic head 10 whose surface is partly removed in order to understand the present invention more clearly.

The metal magnetic layers 13 of the two magnetic core half blocks 3, 4 have a winding groove 5 defined therein to effect head winding. A winding of a thin film coil 6 is formed through the winding groove 5 in order to effect an electromagnetic transduction. The thin film coil 6 is formed on the joint surface of the magnetic core half blocks 3, 4.

On the joint surface of the metal magnetic layers 13, a front gap $g_F$ is formed on a sliding surface 8 along which a magnetic recording medium (not shown) is slid across the winding groove 5 and a back gap $g_B$ is formed on the opposite side of the sliding surface 8.

A thin film coil terminal 7 formed on the joint surface is formed on the same plane of the side surface of the magnetic head 10 intersecting the joint surface. Specifically, although not shown, through the interconnection formed on the magnetic core half blocks 3, 4, the thin film coil 6 is electrically connected to the terminal for thin film coil 6, i.e. connection terminal 7 formed on the side surface 10a of the magnetic head 10.

As the best material of the metal magnetic layers 13, there may be used Sendust (Fe—Al—Si alloy). Moreover, the metal magnetic layer 13 may be made of alloys similar to Sendust or other soft magnetic alloy such as Fe-based crystallite.

As shown in FIG. 8, to obtain a high sensitivity in higher frequency regions, the magnetic head 10 may be formed as a magnetic head of a laminated structure having a plurality of metal magnetic layers 13 formed through the non-magnetic layers 14. With this structure, since the magnetic head 10 has a plurality of separated metal magnetic layers 13, it is possible to reduce an eddy-current loss.

The non-magnetic layer 14 may be made of alumina, $SiO_2$ or SiO and may be made of a mixture of alumina, $SiO_2$ and SiO. A thickness of the non-magnetic layer 14 should be such one which is in excess of a thickness thick enough to achieve an insulating effect at the lowest. If the non-magnetic layer 14 is too thick, then an effective track width decreases, and hence a reproduced output is lowered.

According to the present invention, the metal magnetic layer 13 is made of Sendust and has a thickness of 5 $\mu$m. The non-magnetic layer 14 is made of alumina and has a thickness of 0.15 $\mu$m, The magnetic head 10 was formed as the magnetic head having a laminated structure in which the metal magnetic layer 13 is formed of three layers by alternately laminating the metal magnetic layers 13 and the non-magnetic layers 14.

The process for manufacturing the magnetic head 10 will be described below.

Figure 9:
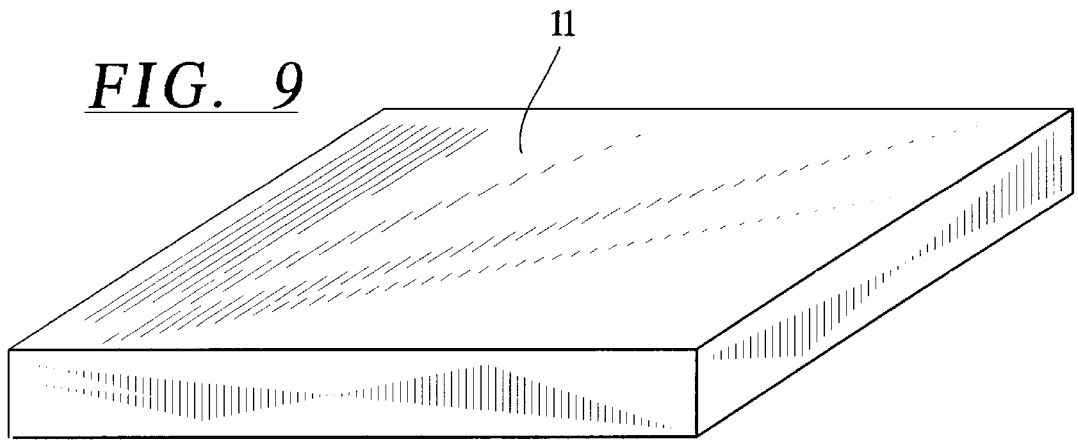
FIG. 9 is a perspective view illustrative of a manufacturing process of a magnetic head according to the present invention.

Initially, as shown in FIG. 9, there is prepared a non-magnetic base 11 made of a non-magnetic material such as MnO—NiO-based non-magnetic material. The non-magnetic base 11 is 30 mm in length, 30 mm in width and about 2 mm in thickness.

Figure 10:
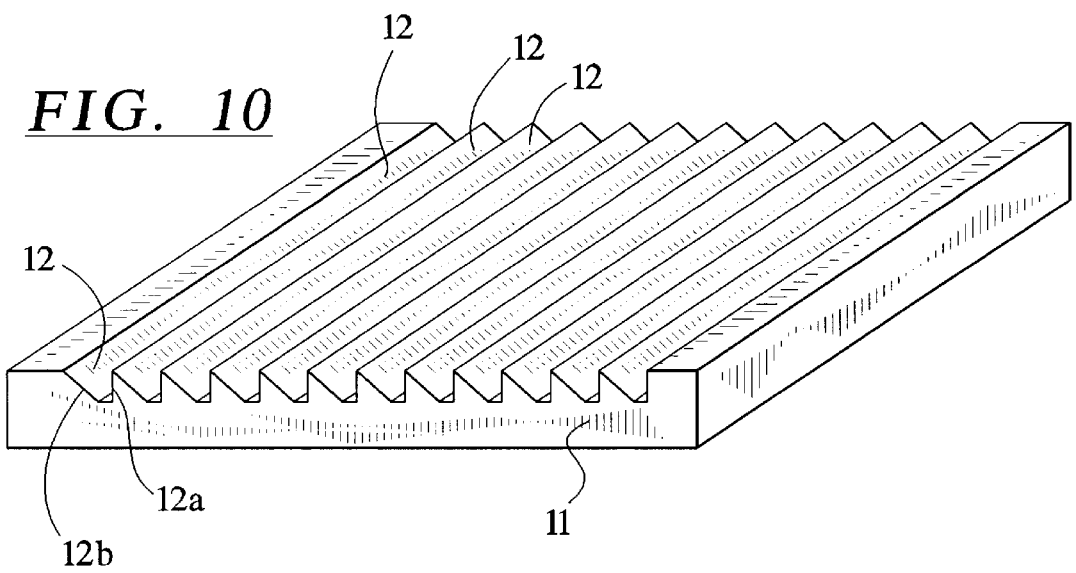
FIG. 10 is a perspective view illustrative of a manufacturing process of a magnetic head according to the present invention.

Then, as shown in FIG. 10, in order to form inclined surfaces for forming magnetic cores, on the major surface of the non-magnetic base 11, there are formed a plurality of magnetic core forming grooves 12 of substantially U-shaped configuration having vertical surfaces 12a and inclined surfaces 12b by a grindstone (not shown) whose one surface has an inclination angle of 45°.

The inclination angle of the inclined surface 12a should preferably be selected in a range of from about 25° to 60°. In order to avoid the occurrence of a false gap and to maintain an accuracy of track width, the inclination angle of the inclined surface 12 should more preferably be selected in a range of from about 35° to 50°. Further, the depth of the magnetic core forming groove 12 is about 130 $\mu$m and the width thereof is about 150 $\mu$m.

Figure 11:
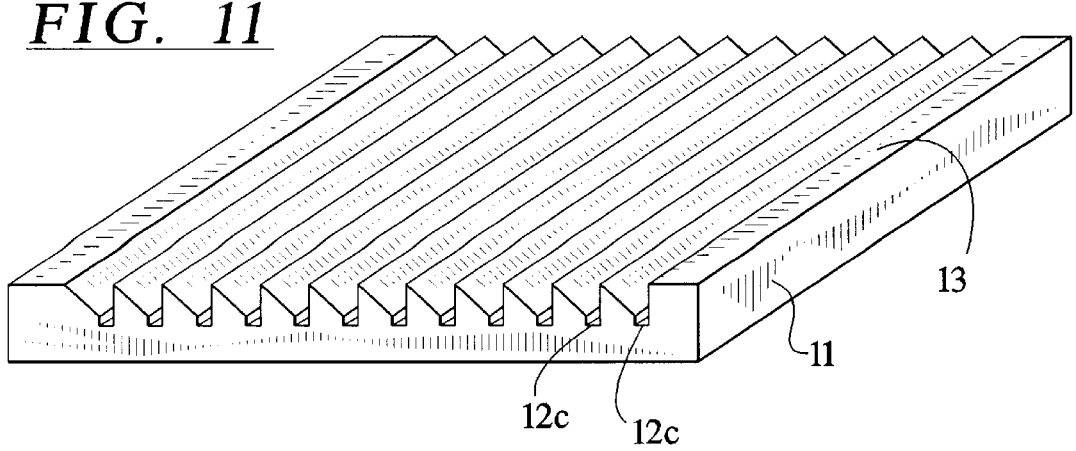
FIG. 11 is a perspective view illustrative of a manufacturing process of a magnetic head according to the present invention.

Then, as shown in FIG. 11, after the metal magnetic layer 13 was formed on the non-magnetic base 11 at its major surface in which the magnetic core forming grooves 12 are formed by physical vapor growth and chemical vapor growth such as sputtering, vapor deposition or MBE (molecular beam epitaxy), the metal magnetic layer 13 is removed from a horizontal bottom surface 12c formed between the vertical surface 12a and the inclined surface 12b of the magnetic core forming groove 12.

Figure 12:
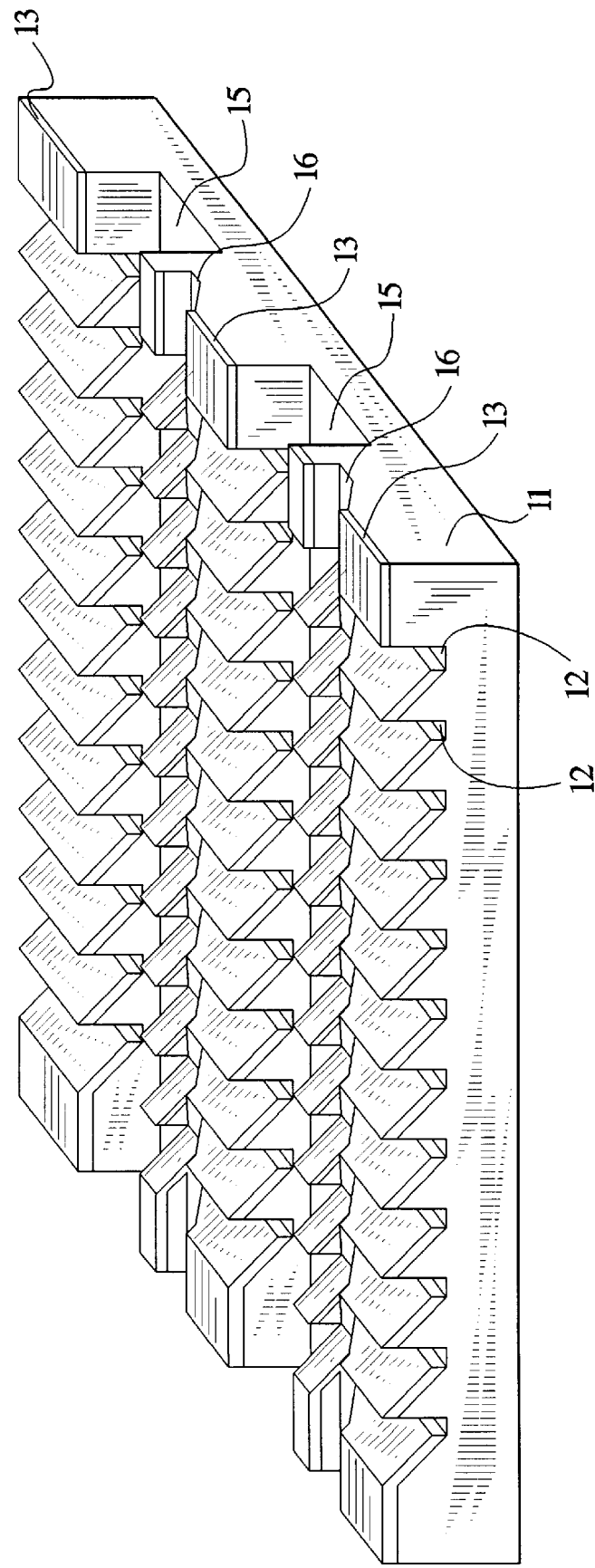
FIG. 12 is a perspective view illustrative of a manufacturing process of a magnetic head according to the present invention.

Then, as shown in FIG. 12, front/back gap separating grooves (hereinafter simply referred to as "separating grooves") 15 for separating adjacent two magnetic cores and winding grooves 16 are respectively formed on the non-magnetic base 11 in the direction substantially perpendicular to the magnetic core forming grooves 12.

The separating groove 15 should have a depth deep enough to completely separate the metal magnetic layer 13. In this embodiment, the depth of the separating groove 15 was 150 $\mu$m from the upper portion of the magnetic core forming groove 12. The width of the separating groove 15 is set such that the length of the front gap $g_F$ becomes 300 $\mu$m and that the length of the back gap $g_B$ becomes 85 $\mu$m. The width of the separating groove 15 may be selected freely and set in consideration of a balance between the length of the front gap $g_F$ and the length of the back gap $g_B$.

The depth of the winding groove 16 may be determined such that the metal magnetic layer 13 may not be cut by the winding groove 16. If the depth of the winding groove 16 is too large, then the length of magnetic path increases, lowering a transfer efficiency of magnetic flux. The width of the winding groove 16 might be determined freely depending on the width of the thin film coil and the number of turns of the thin film coil. In this embodiment, the width of the winding groove 16 was set to 140 µm.

Having considered the shapes of the grooves 15, 16, it is to be noted that the separating groove 15 may take any configuration so long as it can separate the metal magnetic layer 13. With respect to the shape of the winding groove 16, if the winding groove 16 is shaped as a winding groove of an oblique cut-away configuration as shown in FIG. 12, then magnetic flux can be concentrated much more, and hence a high recording density can be obtained.

While the front back side of the winding groove 16 is formed by the grindstone with the inclination angle of 45° as described above, the angle of the inclined surface of the grindstone is not be limited to 45° and may be selected arbitrarily. Moreover, the inclined surface of the grindstone may be circular or polygonal in shape.

Figure 13:
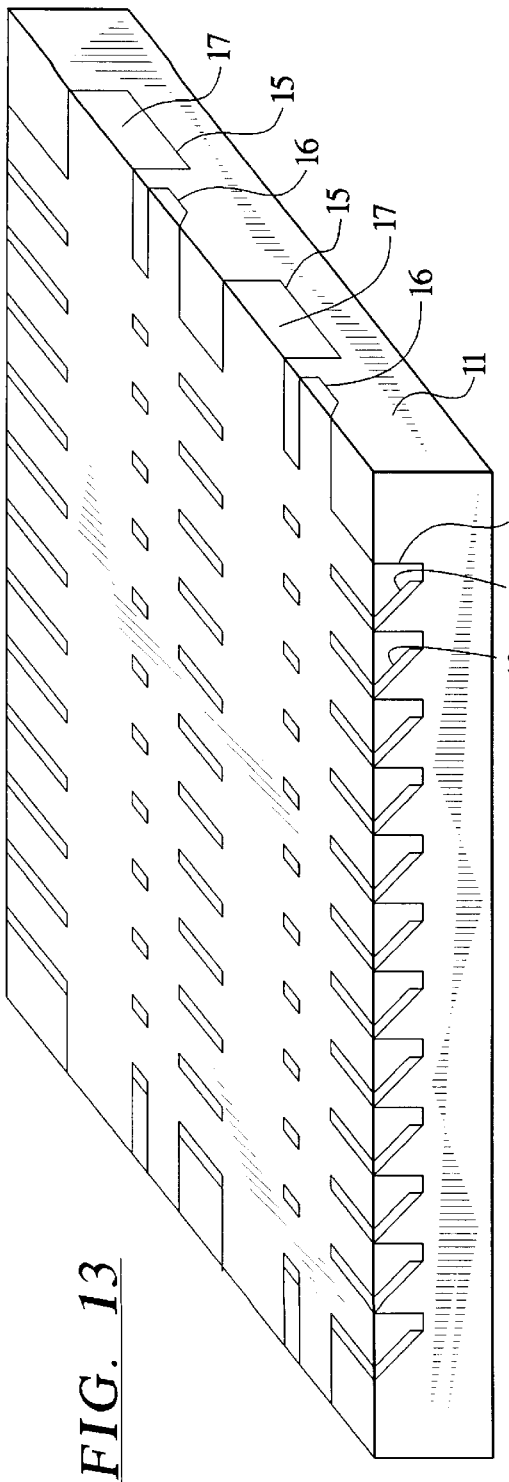
FIG. 13 is a perspective view illustrative of a manufacturing process of a magnetic head according to the present invention.

Then, as shown in FIG. 13, the grooves 12, 15, 16 are filled with glass 17 and the surface of the non-magnetic base 11 is planed. When the surface of the non-magnetic base 11 is planed, extra metal magnetic layers 13 resting on the major surface of the non-magnetic base 11 are removed at the same time.

Figure 14:
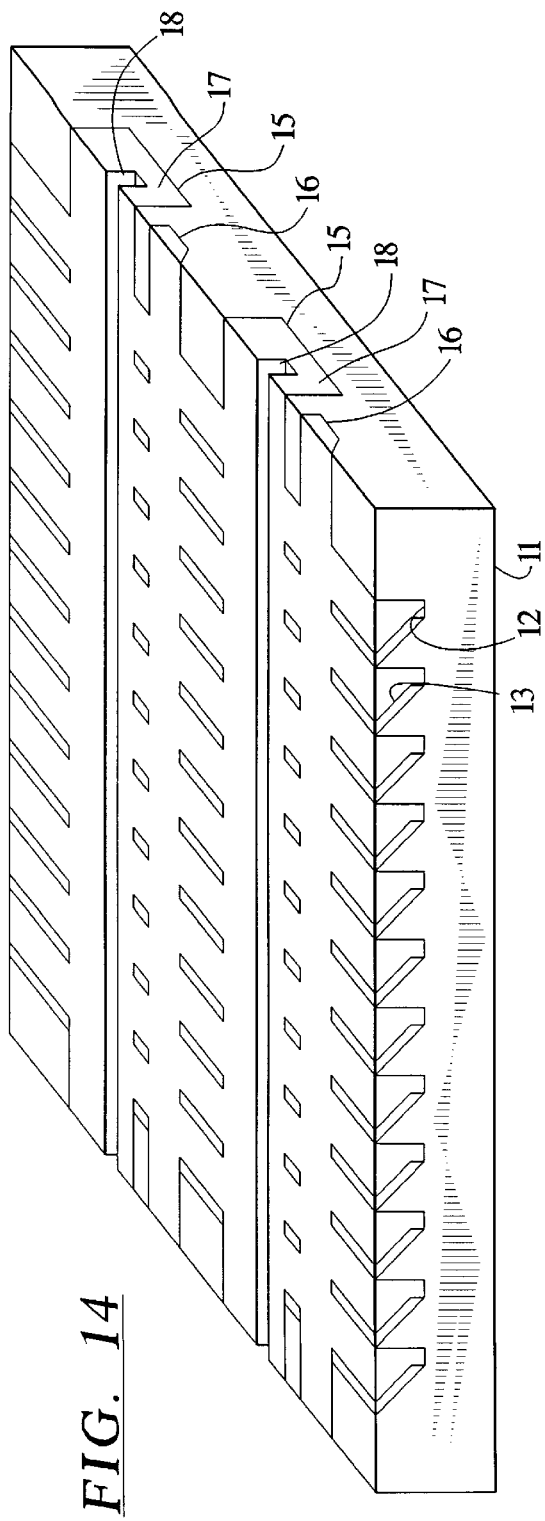
FIG. 14 is a perspective view illustrative of a manufacturing process of a magnetic head according to the present invention.

Then, as shown in FIG. 14, in the separating grooves 15 filled with the glass 17 are formed terminal grooves 18 which are extended in the direction parallel to the separating grooves 15 and the winding grooves 16. The terminal groove 18 is formed outside the portion serving as the back gap $g_B$ in the magnetic head, i.e. the portion between the separating groove 15 and the winding groove 16. The depth and width of the terminal groove 18 may be determined arbitrarily, and are both set to about 100 µm in this embodiment.

Figure 15:
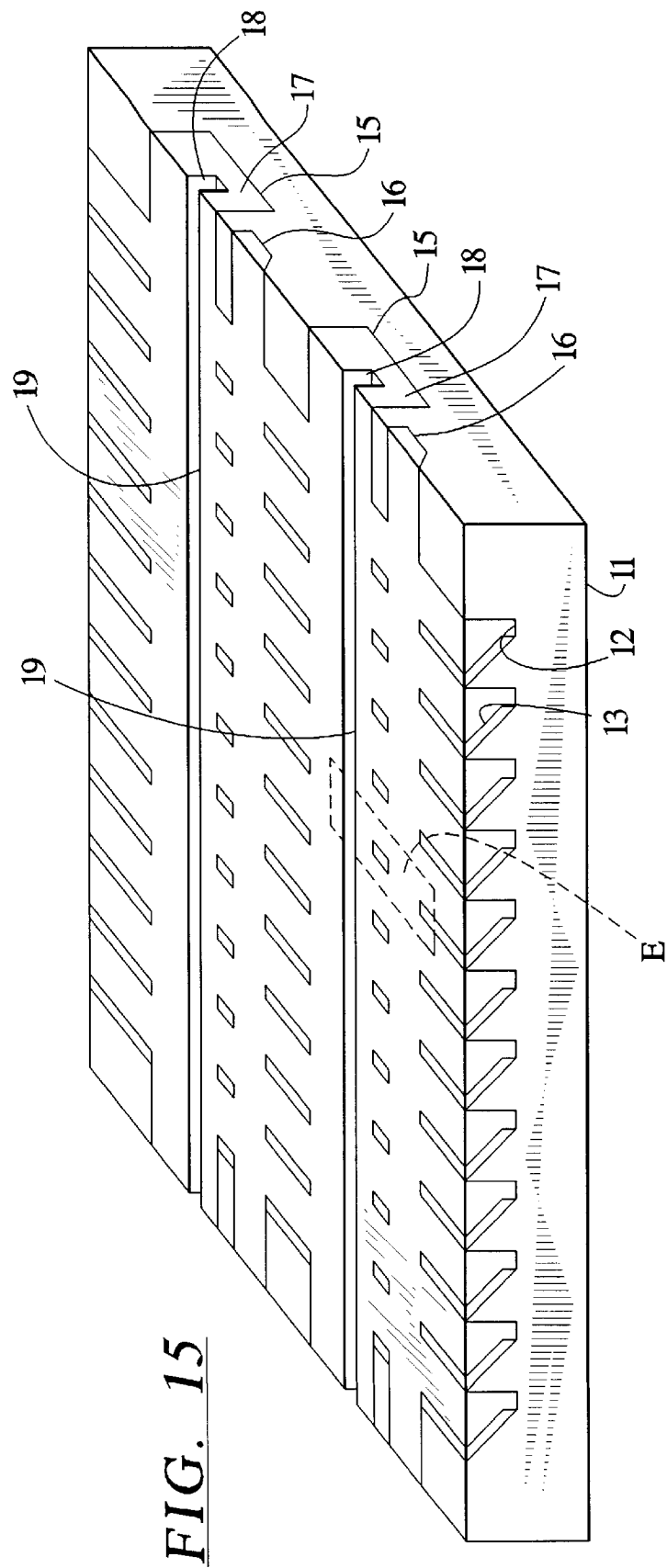
FIG. 15 is a perspective view illustrative of a manufacturing process of a magnetic head according to the present invention.

Then, as shown in FIG. 15, a good conductor such as copper is filled into the terminal grooves 18 by a suitable means such as plating, whereafter terminal conductors 19 serving as coil terminals are formed on the surface of the non-magnetic base 11 and the surface of the non-magnetic base 11 is planed one more time.

Subsequently, a thin film coil is formed in the glass 17. In order to describe the process of forming the thin film coil, a rectangular region shown by a broken-line block E in FIG. 15 will be illustrated below in an enlarged scale.

As shown in FIGS. 16 and 17, a concave portion 20 whose configuration corresponds to the outer configuration of the thin film coil is formed on the glass 17 by selective etching such as ion-milling. FIG. 17 is a cross-sectional view taken along the line XVII—XVII in FIG. 16. Similarly, the process of forming a thin film coil will be described below with reference to like cross-sectional views which follow.

Then, as shown in FIGS. 18 and 19, a metal film 21 such as Au is formed on the whole surface covering the concave portion 20. Then, a resist 22 is formed on the metal film 21, and this resist 22 is shaped as a pattern of a thin film coil. At that time, the pattern of the resist 22 is extended onto the terminal conductor 19.

Figure 20:
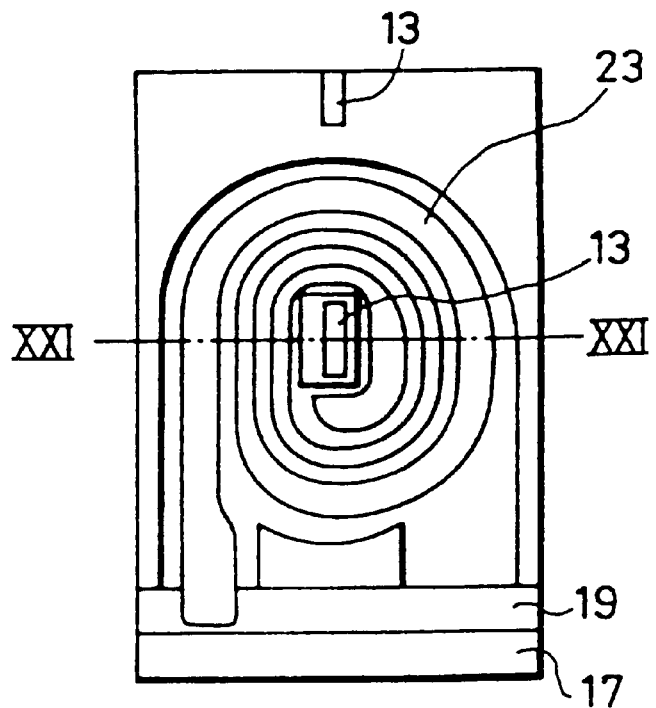
FIG. 20 is a plan view illustrative of a manufacturing process of a magnetic head according to the present invention.
Figure 21:
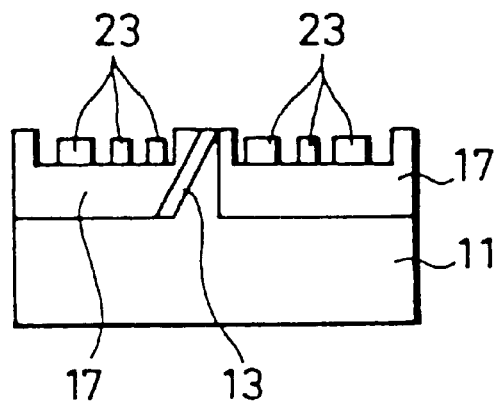
FIG. 21 is a cross-sectional view taken along the line XXI—XXI in FIG. 20.

Then, as shown in FIGS. 20 and 21, the metal film 21 is etched away by some suitable methods such as ion-milling while the resist 22 is being used as a mask, thereby forming a thin film coil 23 of spiral configuration.

Figure 22:
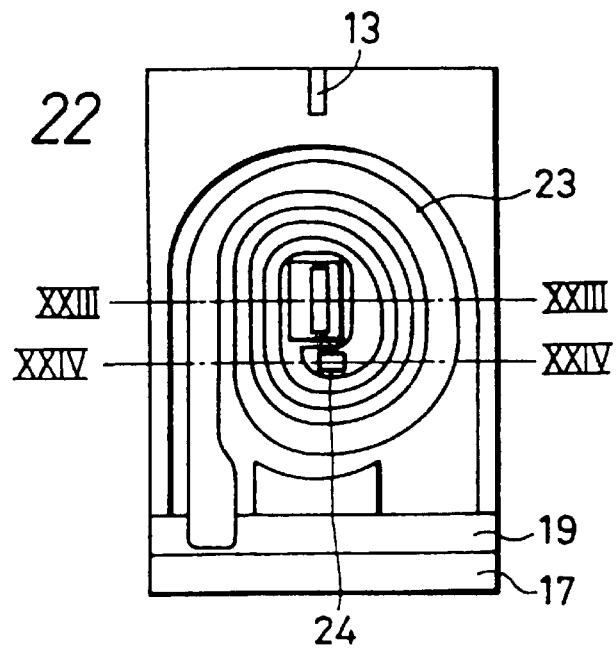
FIG. 22 is a plan view illustrative of a manufacturing process of a magnetic head according to the present invention.
Figure 23:
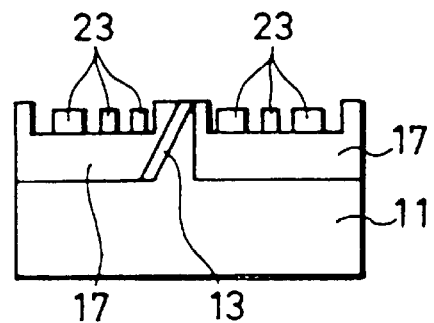
FIG. 23 is a cross-sectional view taken along the line XXIII—XXIII in FIG. 22.
Figure 24:
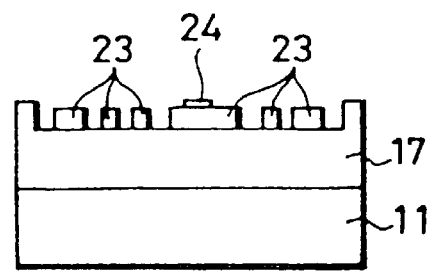
FIG. 24 is a cross-sectional view taken along the line XXIV—XXIV in FIG. 22.

Subsequently, although not shown, the metal film is formed on the whole surface of the thin film coil 23 and treated by patterning through the resist or the like, whereby a contact electrode 24 is formed on the end portion of the thin film coil 23 as shown in FIGS. 22, 23 and 24. FIG. 23 is a cross-sectional view taken along the line XXIII—XXIII in FIG. 22, and FIG. 24 is a cross-sectional view taken along the line XXIV—XXIV in FIG. 22. The process of forming a thin film coil will be described below with reference to like cross-sectional views.

Figure 25:
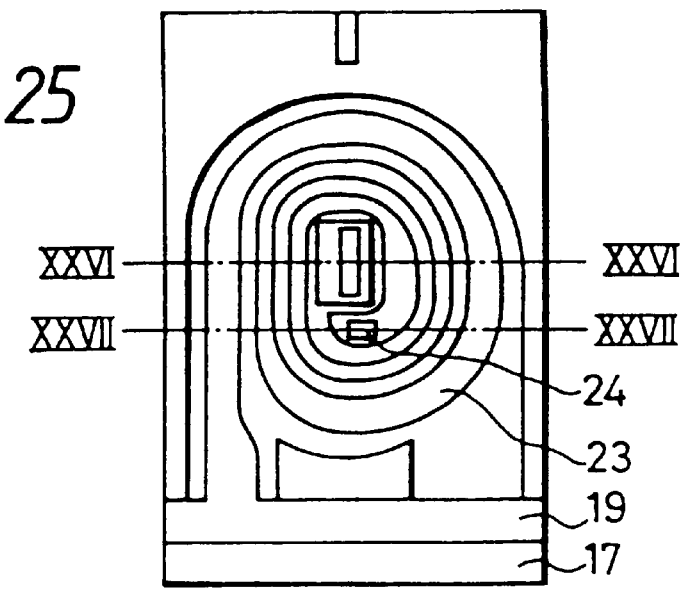
FIG. 25 is a plan view illustrative of a manufacturing process of a magnetic head according to the present invention.
Figure 26:
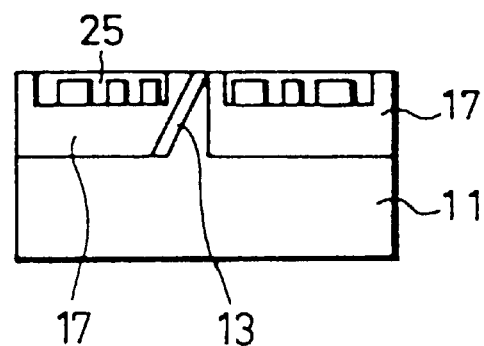
FIG. 26 is a cross-sectional view taken along the line XXVI—XXVI in FIG. 25.
Figure 27:
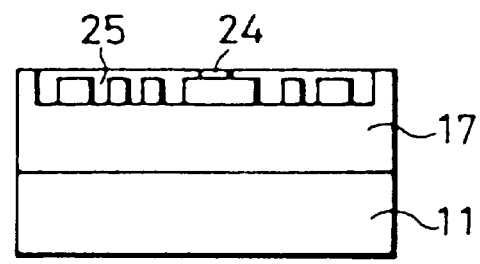
FIG. 27 is a cross-sectional view taken along the line XXVII—XXVII in FIG. 25.

Subsequently, an insulating film 25, made of $SiO_2$ or the like, is formed on the whole surface of the surface as a protecting film of the thin film coil 23. The surface of this insulating film 25 is ground and planed until the metal magnetic layer 13 and the contact electrode 24 are exposed as shown in FIGS. 25, 26 and 27.

Figure 28:
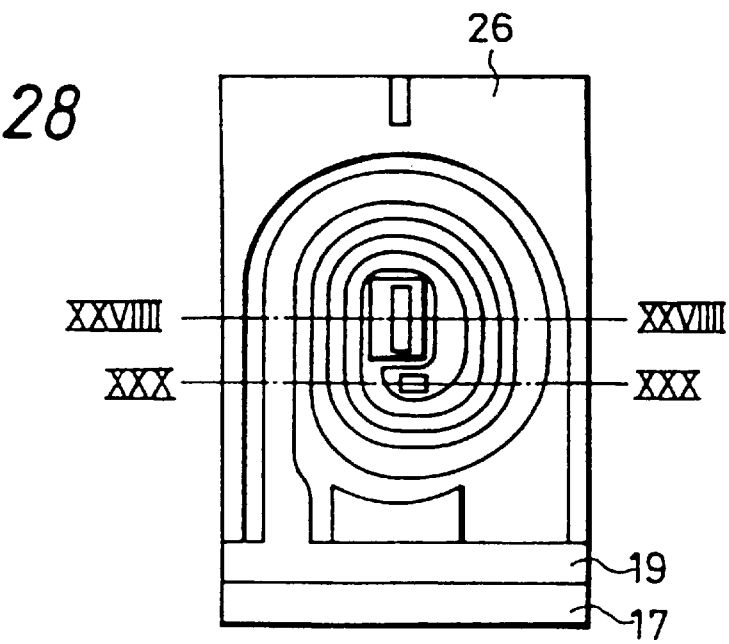
FIG. 28 is a plan view illustrative of a manufacturing process of a magnetic head according to the present invention.
Figure 29:
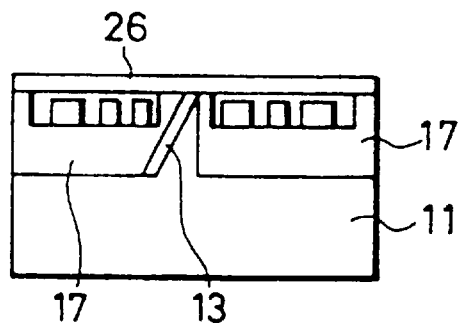
FIG. 29 is a cross-sectional view taken along the line IXXX—IXXX in FIG. 28.
Figure 30:
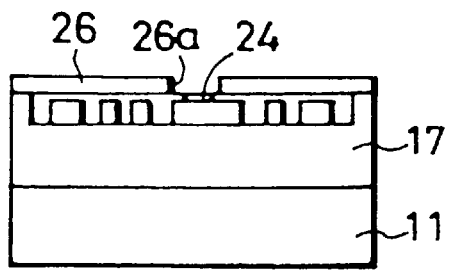
FIG. 30 is a cross-sectional view taken along the line XXX—XXX in FIG. 28.

Then, as shown in FIGS. 28, 29 and 30, a non-magnetic film 26 made of a suitable material such as $SiO_2$ or glass serving as a gap film is formed on the whole surface of the surface, whereafter an opening portion 26a is defined on the non-magnetic film 26 formed on the contact electrode 24 by selective etching, resulting in the contact electrode 24 being exposed.

Figure 31:
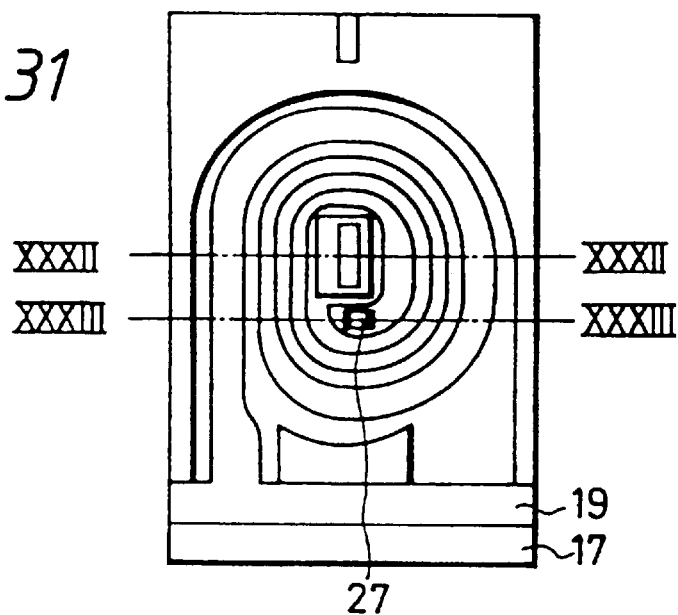
FIG. 31 is a plan view illustrative of a manufacturing process of a magnetic head according to the present invention.
Figure 32:
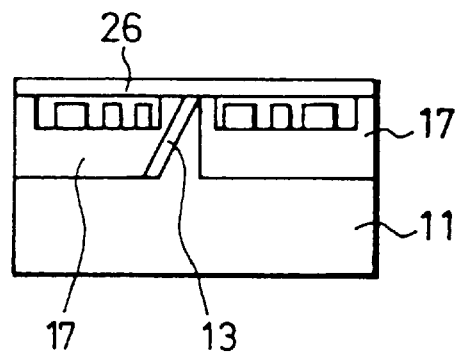
FIG. 32 is a cross-sectional view taken along the line XXXII—XXXII in FIG. 31.
Figure 33:
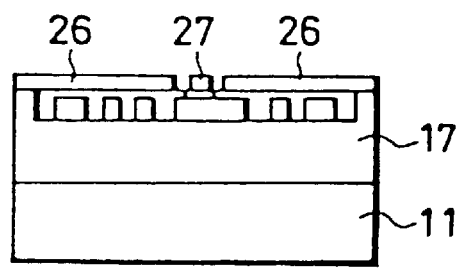
FIG. 33 is a cross-sectional view taken along the line XXXIII—XXXIII in FIG. 31.

Then, as shown in FIGS. 31, 32 and 33, a metal thin film made of a proper material such as Au is formed on the whole surface of the surface. Then, this metal thin film is treated by pattern etching using the resist as the mask, whereby a second contact electrode 27 made of a metal thin film is formed on each contact electrode 24.

Figure 34:
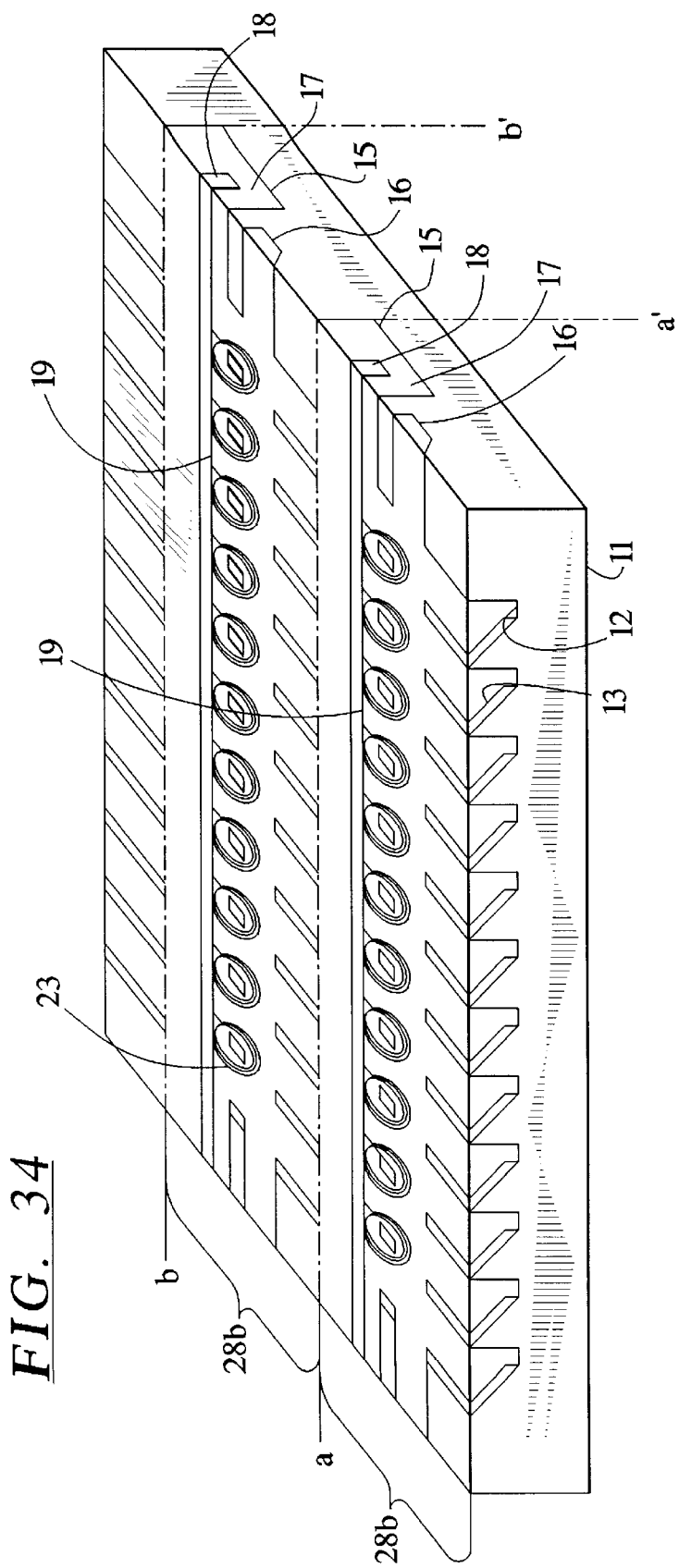
FIG. 34 is a perspective view illustrating a manufacturing process of a magnetic head according to the present invention.

In this manner, there is formed the thin film coil 23 whose one end is connected to the terminal conductor 19 and in which the contact electrode 27 is formed on the other end. FIG. 34 is a perspective view illustrating the whole of the resultant magnetic head assembly.

While the thin film coil 23 and the terminal conductor 19 of the terminal groove 18 are directly connected in the above-mentioned process, the present invention is not limited to the above-mentioned process and the following variant is also possible. That is, a contact electrode and a second contact electrode may be formed on the end portion in the same manner in which the contact electrode and the second contact electrode are formed on the central portion of the thin film coil 23, and the second contact electrode formed on the end portion of the thin film coil and the terminal conductor may be connected by a metal film.

Then, there are provided magnetic core half blocks 28a, 28b of each column by cutting the non-magnetic base 11 along lines a–a' and b–b' in FIG. 34.

Figure 35:
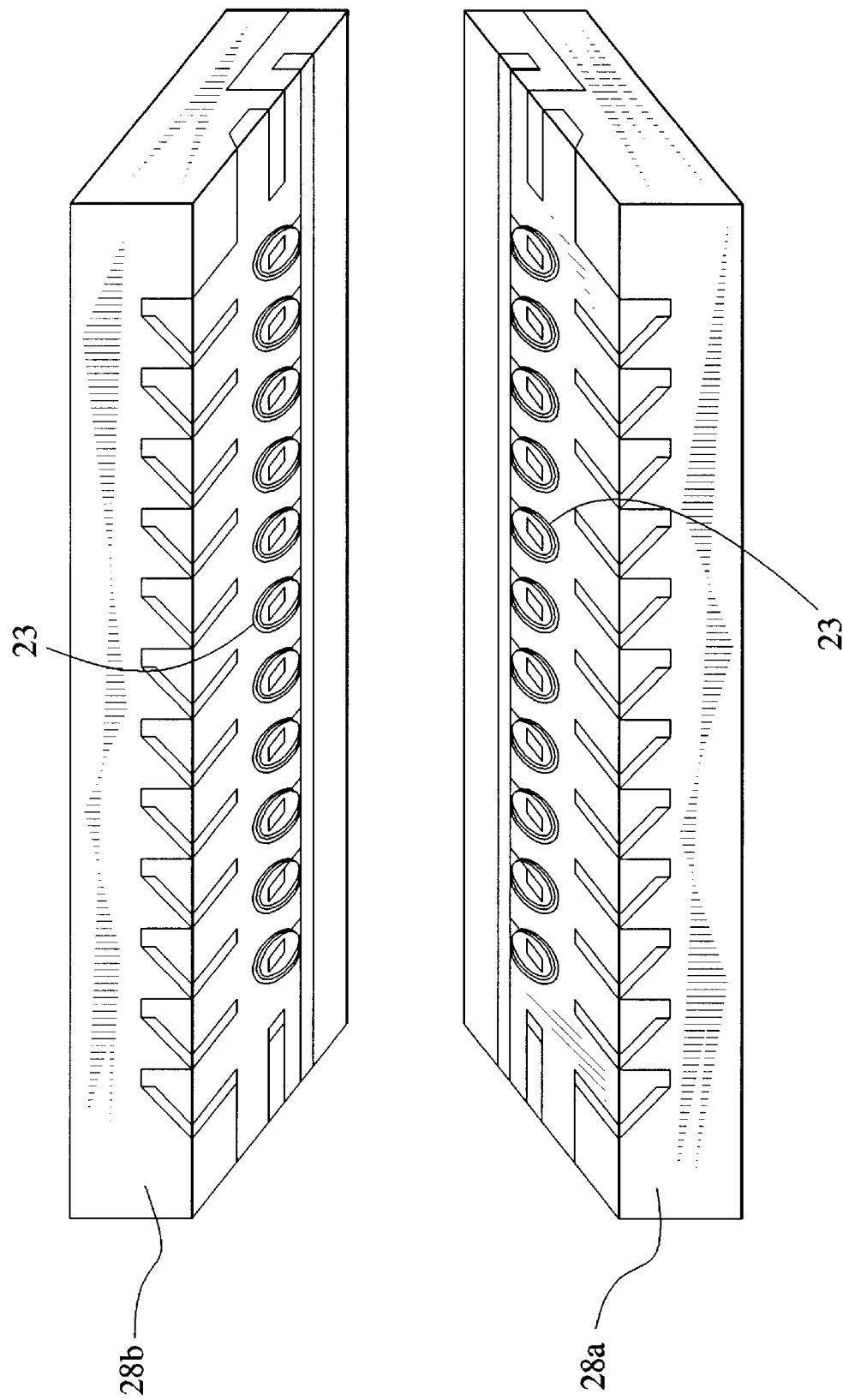
FIG. 35 is a perspective view illustrating a manufacturing process of a magnetic head according to the present invention.
Figure 36:
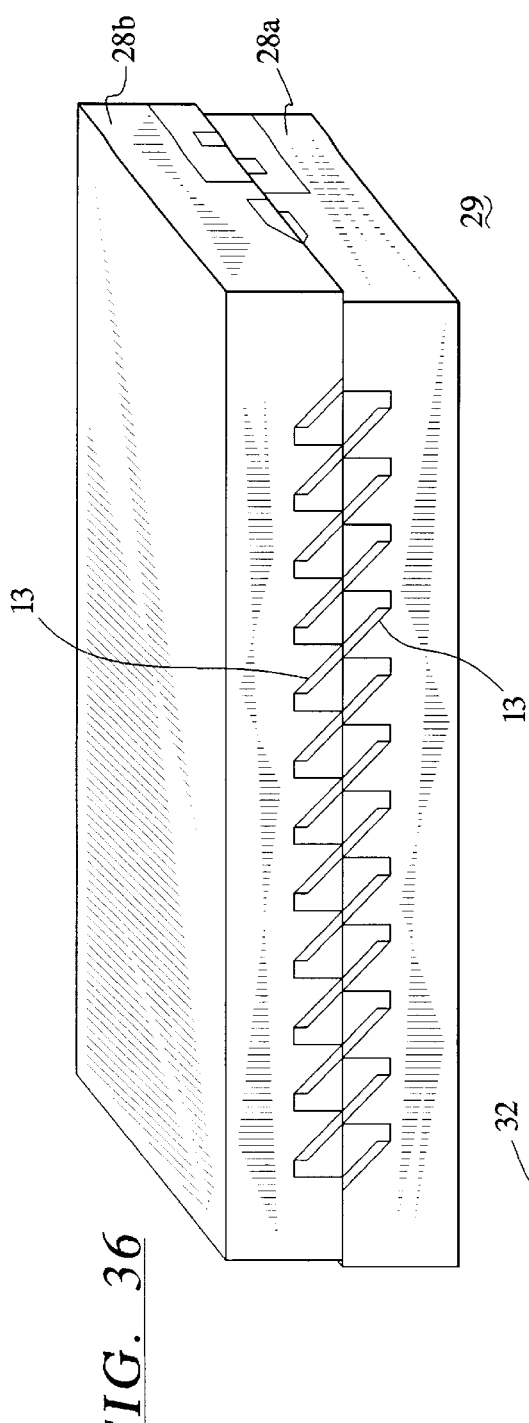
FIG. 36 is a perspective view illustrating a manufacturing process of a magnetic head according to the present invention.

Subsequently, as shown in FIGS. 35 and 36 in that order, a magnetic core block 29 is formed by integrally joining a pair of magnetic core half blocks 28a, 28b. At that time, the contact electrodes 27 of the thin film coils 23 formed on a pair of magnetic core half blocks 28a, 28b are abutted against each other. Thereafter, the metal magnetic layers 13 forming the magnetic gaps also are abutted against each other.

While the thin film coils 23 are formed on the two magnetic core half blocks 28a, 28b as described above, the present invention is not limited thereto and the thin film coil 23 may be formed only on one magnetic core half block.

While the head chips are cut at every column and joined as described above, the present invention is not limited thereto and the head chip may be cut into respective magnetic core half blocks and these magnetic core half blocks may be joined.

As a method of joining head chips, there may be used a method of joining head chips by using an adhesive in addition to a method for joining head chips by using gold bonding.

The magnetic core block 29 thus integrally bonded shown in FIG. 36 is cut finally. By this cutting, the coil terminal formed of the terminal conductor 19 with the end portion of the thin film coil 23 connected thereto, i.e. connection terminal (see FIG. 7) is opposed to the cutting surface. Thus, there is obtained the magnetic head 10 with the structure shown in FIGS. 7 and 8.

A process for assembling this magnetic head (head chip) 10 on a head base will be described below.

Figure 37:
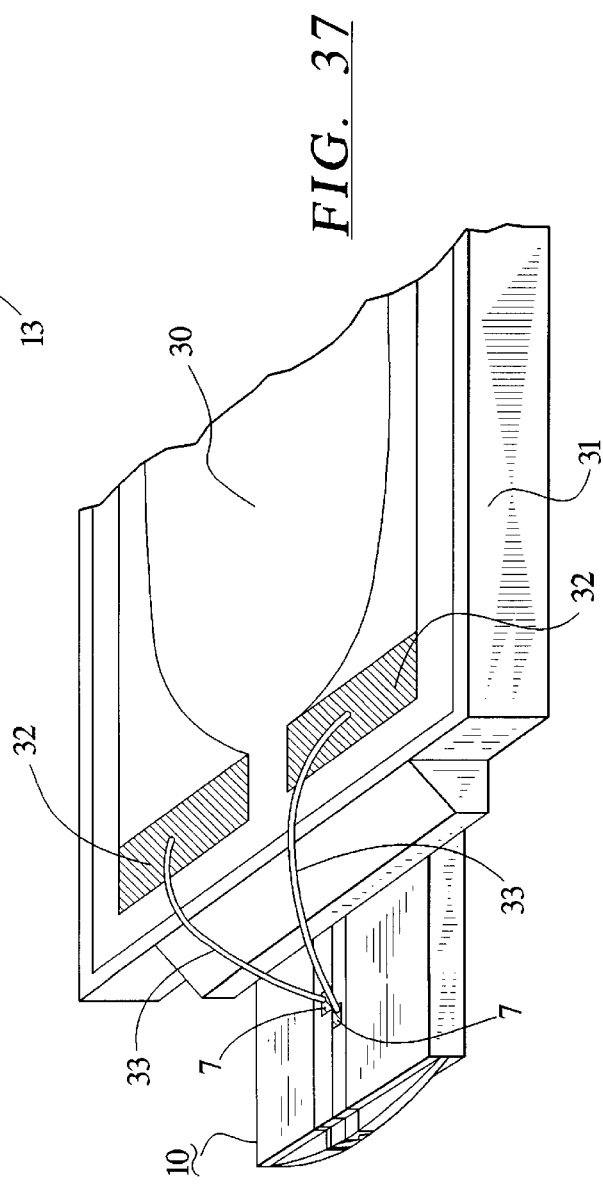
FIG. 37 is a perspective view illustrating the manner in which a magnetic head is fixed to a head base.

As shown in FIG. 37, the magnetic head 10 is attached to a head base 31 having a terminal plate 30 on its surface at the opposite side of the terminal plate 30 such that the side surface on which the two connection terminals 7 are formed is directed to the head base 31. Then, two terminals 32 on the terminal plate 30 and the two connection terminals 7 are connected by connection 33.

Figure 1:
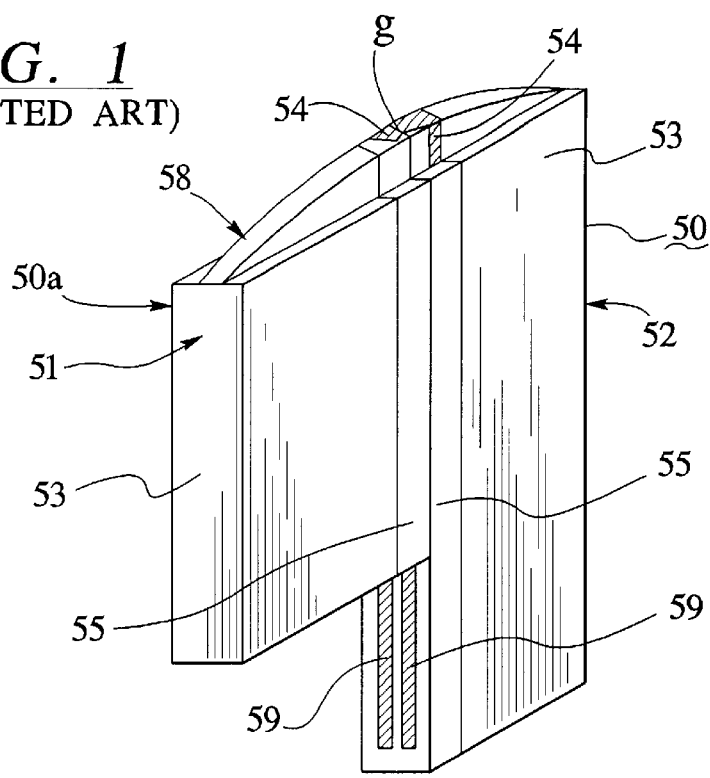
FIG. 1 is a perspective view illustrating an example of a bulk thin film magnetic head.
Figure 2:
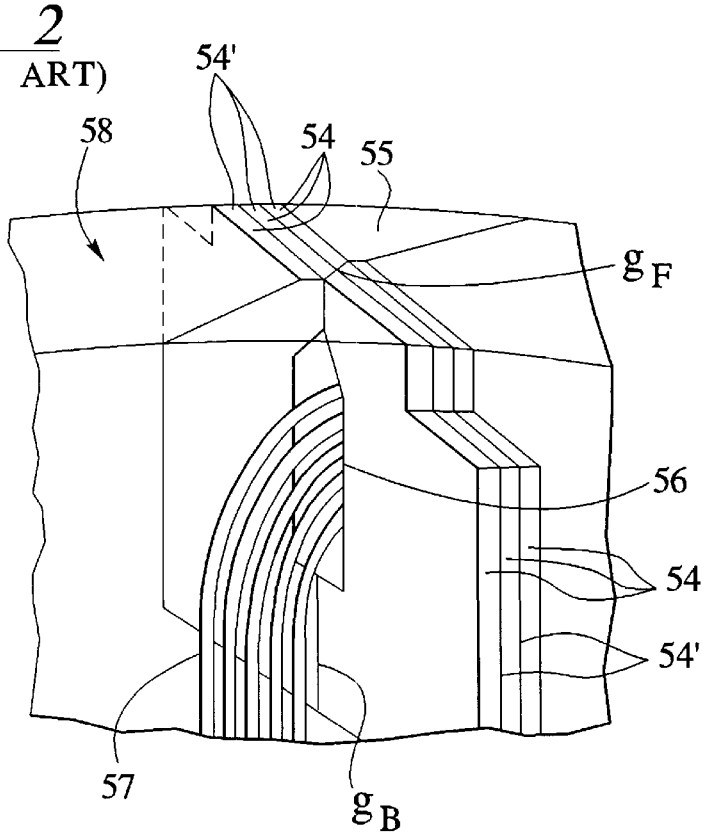
FIG. 2 is a schematic diagram showing a part of the bulk thin film magnetic head shown in FIG. 1 in an enlarged scale.
Figure 3:
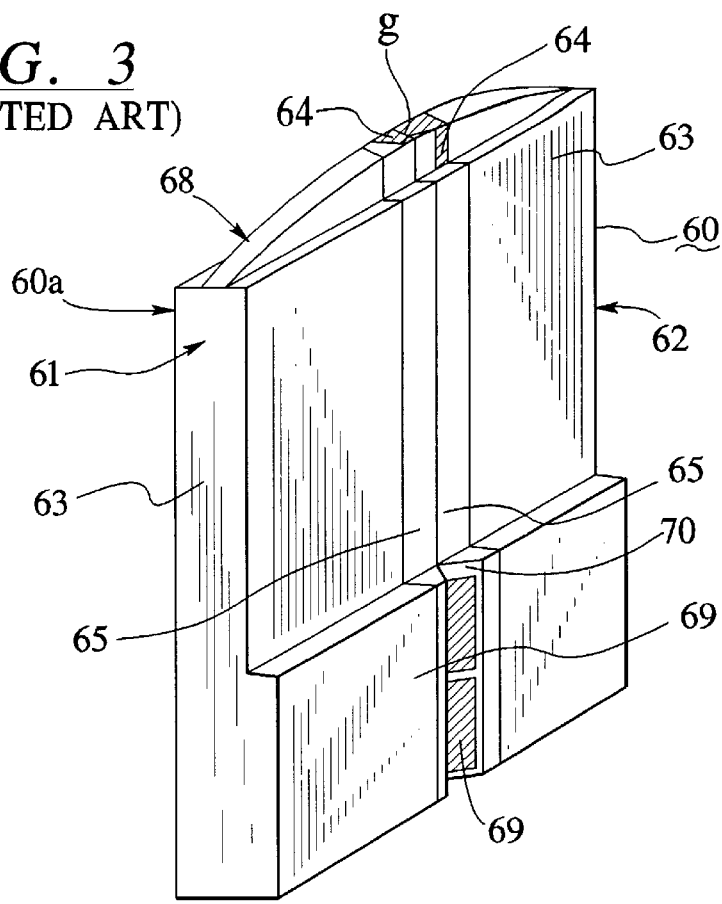
FIG. 3 is a perspective view illustrating another example of a bulk thin film magnetic head.
Figure 4:
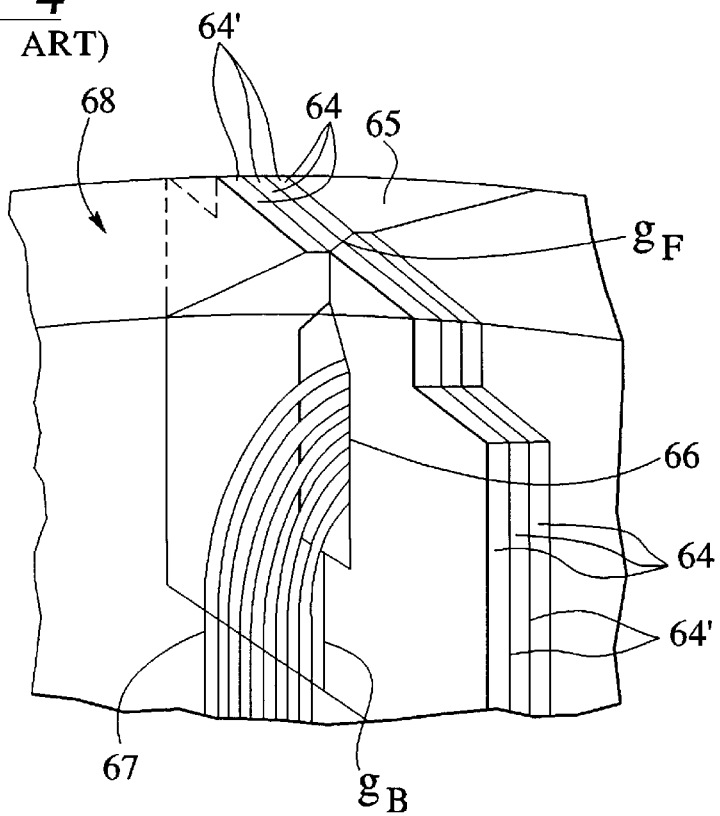
FIG. 4 is a schematic diagram showing a part of the bulk thin film magnetic head shown in FIG. 3 in an enlarged scale.
Figure 5:
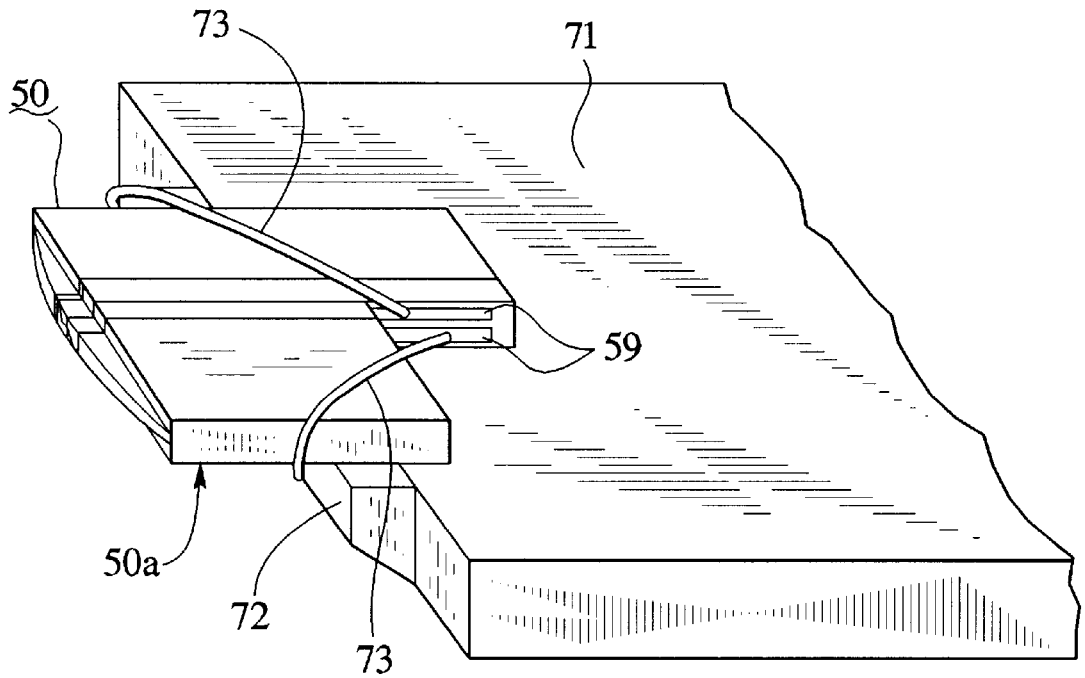
FIG. 5 is a perspective view illustrating the manner in which the bulk thin film magnetic head shown in FIGS. 1 and 2 is fixed to a head base.
Figure 6:
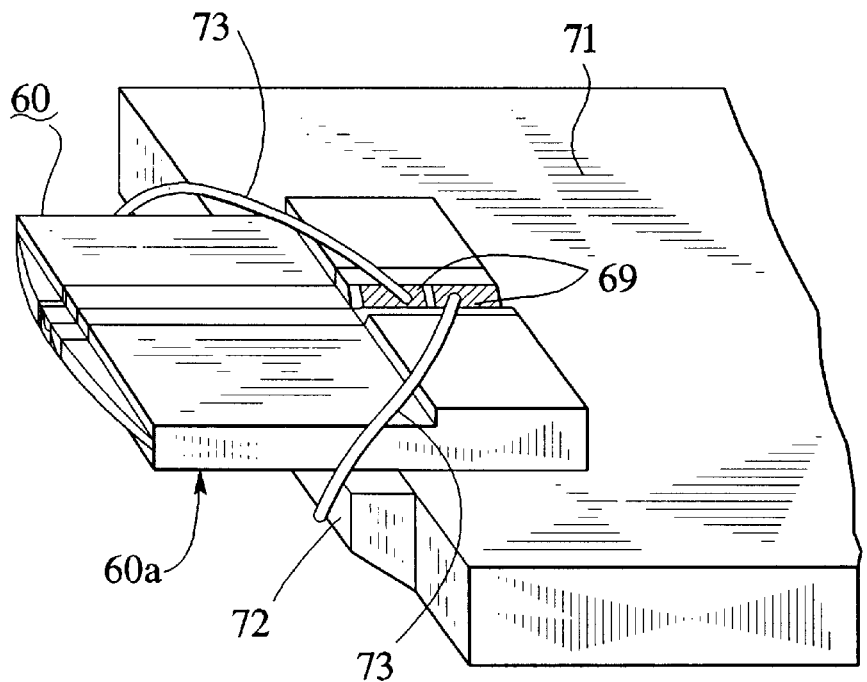
FIG. 6 is a perspective view illustrating the manner in which the bulk thin film magnetic head shown in FIGS. 3 and 4 is fixed to a head base.

In the case of the previously-proposed bulk thin film magnetic heads, with respect to the bulk thin film magnetic heads 50, 60 shown in FIGS. 1, 2, 3 and 4, since the connection terminals 59, 69 of the thin film coils and the terminal portion 72 on the head base 71 are not disposed on the parallel plane as shown in FIGS. 5 and 6, these connections 73 require the complex process in which the magnetic head must be rotated each time the connection 73 is made.

According to the present invention, as shown in FIG. 37, because the connection terminals 7 formed of the side surfaces of the terminal grooves provided on the side surface 10a of the magnetic head 10 can be used, the connection terminals 7 of the thin film coil and the terminal plate 30 are resting on substantially the parallel plane and can be joined together through the connections 33 by a simple method, e.g. method such as wire bonding used to fabricate semiconductor devices.

According to the aforesaid embodiment, since the thin film coil exists on the same plane of the head side surface intersecting the joint surface, the terminals of the thin film coil and the external terminal plates exist within substantially the same plane. Therefore, without a cumbersome work such as rotating the head, the thin film coil can be connected to the outside.

Therefore, the thin film coil can be easily connected to the outside by using a soldering machine used to manufacture the magnetic head and a wire bonding machine used to fabricate semiconductor devices. Thus, the manufacturing process of magnetic head can be simplified and a time required by such manufacturing process can be reduced, which can as a result produce magnetic heads inexpensively.

Figure 38:
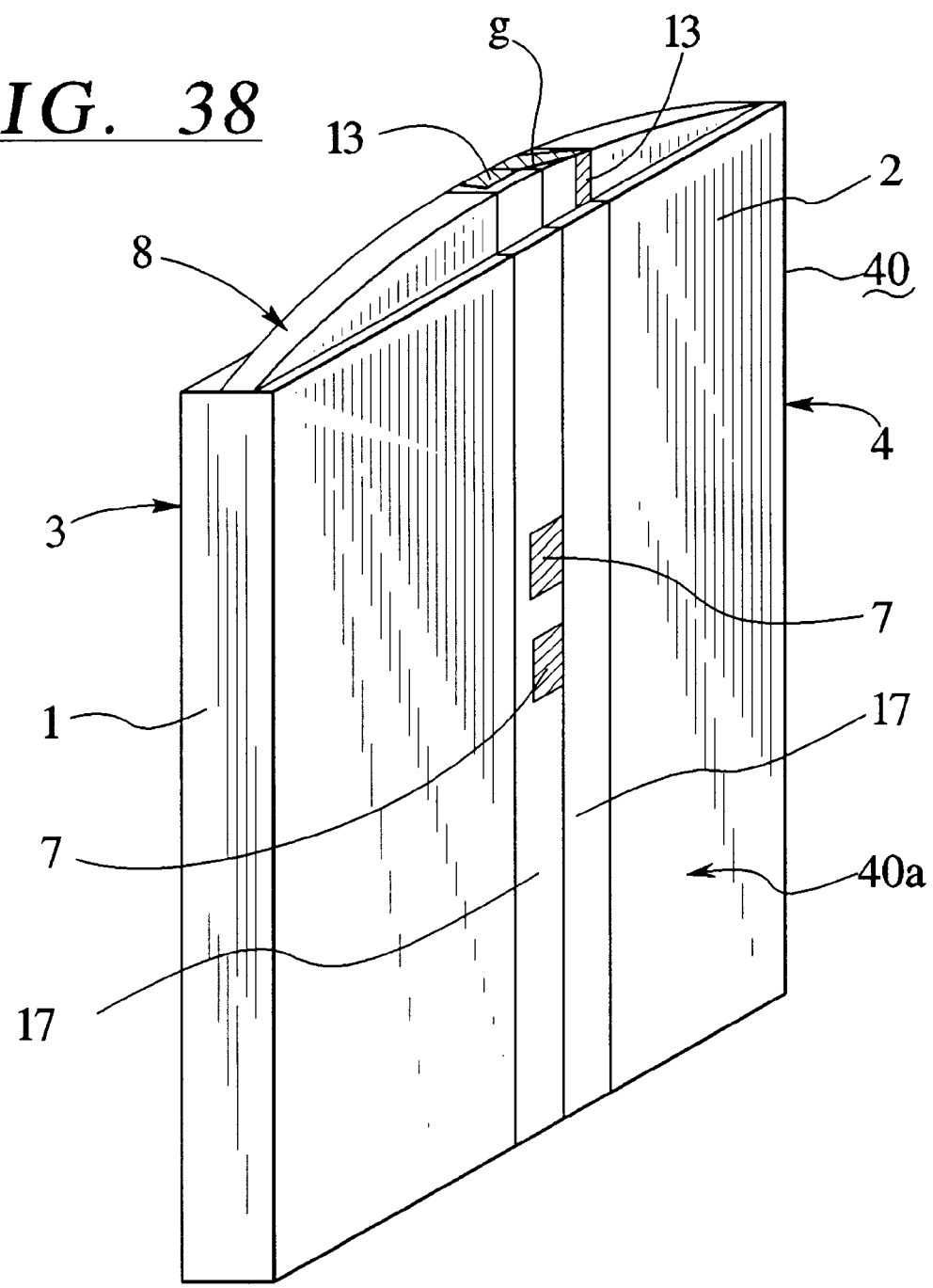
FIG. 38 is a perspective view illustrating a magnetic head according to another embodiment of the present invention.

While the connection terminals 7 are formed on the two magnetic core half blocks 3, 4 of the magnetic head 10 as described above, the present invention is not limited thereto and two connection terminals may be formed on one magnetic core half block. FIG. 38 is a perspective view illustrating another embodiment obtained at that time, i.e. magnetic head according to another embodiment of the present invention.

In a magnetic head 40 shown in FIG. 38, two of the connection terminals 7 which are the terminals of the thin film magnetic head are formed within the glass 17 of at least one magnetic core half block 3.

A rest of structures of the magnetic head 40 shown in FIG. 38 is similar to that of the magnetic head 10 shown in FIG. 7. Thus, in FIG. 38, elements and parts identical to those of FIG. 7 are marked with the same references and therefore need not be described.

Also in this case, similarly to the magnetic head 10 shown in FIG. 7, the connection terminals exist on the same plane of a head side surface 40a intersecting the joint surface of the magnetic core half blocks 3, 4, i.e. on the same plane of the joint surface in which the magnetic head 40 and the head base are joined together so that the thin film coil can be connected to the head base by a simple method.

According to the magnetic head of the present invention, since the thin film coil exists on the same plane of the head side surface intersecting the joint surface, the terminals of the thin film coil and the external terminal plate exist on substantially the parallel plane. Therefore, the thin film coil can be connected to the outside without the cumbersome work for rotating the head.

According to the present invention, the thin film coil can be easily connected to the outside by using a soldering machine used to manufacture magnetic heads and a wire bonding machine used to fabricate semiconductor devices.

Therefore, the manufacturing process of the magnetic head can be simplified and a time required by such manufacturing process can be reduced, which can therefore provide inexpensive magnetic heads.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A magnetic head comprising:

a head base made of a non-magnetic material, said head base having a first flat surface;

a magnetic core bonded to said head base first flat surface and composed of a pair of magnetic core half blocks which form a closed magnetic circuit when said pair of magnetic core half blocks are joined, each of said magnetic core half blocks comprising a non-magnetic portion and a magnetic material portion, the magnetic material portions being joined at a joint surface so as to face each in opposing relationship, said magnetic material portions being positioned between said non-magnetic portions, said joint surface being coincident with a magnetic gap formed by the magnetic core half blocks. said magnetic gap having a track width extending in a track width direction;

a recess defined along said joint surface at one end of said magnetic gap with reference to said track width direction:

glass in said recess; and a thin film coil formed on said joint surface at which said pair of magnetic core half blocks are joined, wherein terminals of said thin film coil are formed and exposed on a plane of an outer head side surface intersecting a plane of said joint surface, said plane of said outer head surface extending parallel to said first flat surface of said head base, said terminals being exposed on a portion of said outer head surface defined by said glass.

2. A magnetic claim as claimed in claim 1, in which said thin film coil has two terminals formed at different positions in a gap depth direction of said magnetic gap.

3. The magnetic head of claim 1 wherein said coil is formed on said glass.

* * * * *